United States Patent [19]
Kaiser et al.

[11] Patent Number: 4,955,767
[45] Date of Patent: Sep. 11, 1990

[54] BORING ATTACHMENT

[75] Inventors: Heinz Kaiser, Wallisellen; Rudolf Stadelmann, Niederuzwil, both of Switzerland

[73] Assignee: Heinz Kaiser AG, Rumlang, Switzerland

[21] Appl. No.: 216,143

[22] Filed: Jul. 7, 1988

[30] Foreign Application Priority Data

Jul. 20, 1987 [CH] Switzerland ............ 2736/87

[51] Int. Cl.$^5$ ............................................. B23B 27/00
[52] U.S. Cl. ...................................... 408/146; 408/59;
408/147; 408/181
[58] Field of Search ............... 408/56, 57, 59, 143,
408/147, 153, 181, 186, 197, 198, 199, 200, 184,
179; 279/1 C, 1 L, 20, 83

[56] References Cited
U.S. PATENT DOCUMENTS

| | | | |
|---|---|---|---|
| 807,166 | 12/1905 | Grant | 408/239 |
| 857,151 | 6/1907 | Booth | 279/83 |
| 995,997 | 6/1911 | Bilhartz | 279/6 |
| 1,867,359 | 7/1932 | Higby | 279/83 |
| 2,096,489 | 10/1937 | Hassig | 408/153 |
| 2,305,737 | 12/1942 | Richards | 408/181 |
| 2,564,460 | 8/1951 | Blanco | 279/6 |
| 2,654,610 | 10/1953 | De Vlieg | 408/181 |
| 2,661,218 | 12/1953 | Snow et al. | 408/181 |
| 2,838,316 | 6/1958 | Thomas | 408/181 |
| 3,044,322 | 7/1962 | George | 408/181 |
| 3,044,323 | 7/1962 | Sweeny | 408/179 |

FOREIGN PATENT DOCUMENTS

| | | | |
|---|---|---|---|
| 2247612 | 4/1973 | Fed. Rep. of Germany | 408/59 |
| 3510259 | 9/1985 | Fed. Rep. of Germany | 408/199 |
| 2563132 | 10/1985 | France | 408/147 |
| 437042 | 6/1948 | Italy | 408/184 |
| 468834 | 2/1952 | Italy | 408/99 |
| 302177 | 4/1971 | U.S.S.R. | 408/181 |

Primary Examiner—Daniel W. Howell
Attorney, Agent, or Firm—Weiser & Stapler

[57] ABSTRACT

A boring attachment has a boring head with a transversely adjustable slide for setting the boring cutter. The slide has a bore for receiving (clamping) a holding device, at a length which is adjustable in the axial direction, so that the holding device is longitudinally displaceable by an amount equaling at least twice the diameter of the recess. Loading at the cutter holder is essentially completely eliminated when the holding device is located in a transversely displaced position which is within the principle operating range of the boring head by providing appropriate bores in the body of the boring head. A relatively small overall height for the boring head contributes to optimal stability of the boring attachment.

7 Claims, 2 Drawing Sheets

BORING ATTACHMENT

BACKGROUND OF THE INVENTION

The present invention generally relates to a boring attachment for a drilling and milling machine, lathe or other automatic machine of this general type.

Such boring attachments have been known for some time and are used for the precision machining of bores with diameters smaller than 50 mm. To this end, a boring tool with a cylindrical clamping shaft is used, which is coaxially clamped in the forward end of a boring head to provide an effective cutting edge (preferably formed of a high-speed machining steel, hard alloy, or other cutting material, or as a reversible carbide tip). Fine adjustment of such boring tools is performed by transverse displacement of the cutting edge using an appropriate mechanism.

Boring attachments of this general type are known from CH-A No. 508,440 and DE-GM No. 74 38 172, but can only be used at relatively low rotation speeds. Since new cutting-edge-forming materials with higher heat resistance have been available for some time, much higher speeds would ordinarily be possible, which would permit a considerable savings in operating time. However, vibration, which is the consequence of an imbalance (loading) which inherently develops upon displacement of the boring tool, tends to reduce the precision of such borings (with good surface finish) at the high speeds which would ordinarily be permissible for such new cutting materials.

To eliminate this imbalance (loading), DE-A No. 35 10 259 suggests mounting a balancing device on the boring attachment which has balancing weights in the shape of circular disk segments and which can be pivoted from their initial position around a common fulcrum point by means of pull-cords attached to the segment bodies. However, such a balancing device inherently increases the overall height of the boring head and requires grooves which reduce the stability of the boring head. It is also a disadvantage that the balancing device must be readjusted after each significant adjustment of the boring tool. Experience has shown that this readjustment is often omitted, through negligence, which can cause damage to the workpiece.

What is more, boring tools with different lengths, and consequently with different weights, must be used for different machining depths. It has been found that these differences in weight can be only partially compensated for with the abovementioned balancing device. Because of this, only a limited number of boring tools are available, as a consequence of which these tools are often either too short or too long for their particular practical application. This is significant since every millimeter of excess length of the boring tool causes an impairment of its vibration characteristics, and accordingly the surface finish of the bore to be machined, or makes it necessary to resort to lower operating speeds and hence a less economical operation.

SUMMARY OF THE INVENTION

It is therefore the principle object of the present invention to provide a boring attachment of the type generally described above which avoids the aforementioned disadvantages, and which is particularly suited to operation at high speeds.

It is also an object of the present invention to provide a boring attachment of this general type which assures a high surface quality, yet which is simple in design and easy to operate.

These and other objects are achieved according to the present invention by providing a boring attachment with an adjustable boring width and comprising a working head having a support surface abutting against a connecting portion and a connecting shaft receivable within said connecting portion, and a transversely displaceable slide for receiving a cutter holder and including a recess for receiving the cutter holder, with certain improvements including a cutter holder which is longitudinally displaceable by an amount equaling at least twice the diameter of the recess, a boring head which is balanced such that loading is essentially completely eliminated when the cutter holder is in a transversely displaced position which is within the prescribed operating range for the boring head, and a boring head having an overall height which is approximately equal to or less than the diameter of the boring head.

Since the holding device for the cutter holder is adjustable in depth (axial extension) within the boring attachment of the present invention, the distance between the support surface of the boring head and the cutting edge can always be kept optimally short. What is more, the previously described adjustable balancing device can be omitted. Further, since the body of the boring head will then have a shape that is more favorable for its principal applications, it is made possible to eliminate the need for a set of boring tool holders with different weights.

Thus, both the small overall height of the boring head, and the axial adjustability of the holding device, play an essential role for the boring tool in terms of stability, and consequently, in terms of its tendency to vibrate. What is more, since the holding device must be changed less frequently when using the boring attachment of the present invention, and since the need to adjust a balancing device is eliminated, this operation is made significantly simpler as compared to state of the art devices.

Further detail regarding a preferred embodiment boring attachment according to the present invention may be had with reference to the description which is provided below, taken in connection with the following illustrations.

BRIEF DESCRIPTION OF THE DRAWINGS

In the several views provided, like reference numerals denote similar structures.

DETAILED DESCRIPTION OF THE PREFERRED EMBODIMENT

Figure 1:
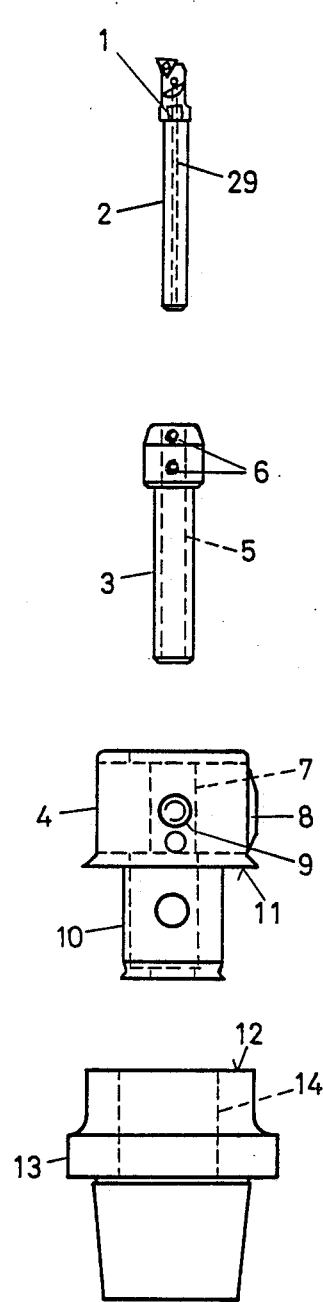
FIG. 1 is an exploded view of the boring attachment of the present invention.

As is shown in FIG. 1, the leading end of the boring attachment receives an interchangeable cutter holder 1 attached to a cylindrical shaft 2, which is adjustable (with a small play) in a longitudinal direction within a bore 5 of a correspondingly cylindrical reducing bush 3 (and which can be fixed in position by means of two screws 6 disposed in the reducing bush 3). The shaft 2 preferably includes a channel 29 (shown in phantom) for the supply of oil to the cutting edge. As will be described more fully below, the reducing bush 3 is in turn received in a recess 7 of a boring head 4 (with a small play), and is made both longitudinally (axially) displaceable and fixable in its desired position by a clamping device 23, 24 (see FIGS. 2a and 2b). If desired, the reducing bush 3 may be omitted. However, in such case, the shaft 2 is then configured to approximate the weight of a holding device with the reducing bush 3.

Figure 2A:
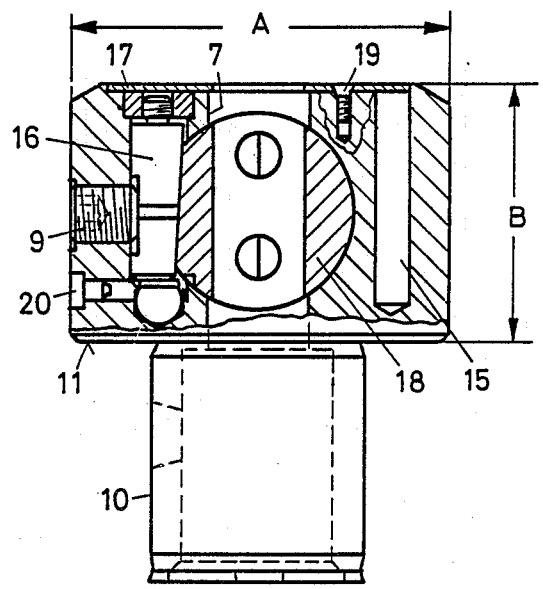
FIGS. 2a and 2b are orthogonal elevational views of the boring attachment, with portions broken away to reveal construction detail.
Figure 2B:
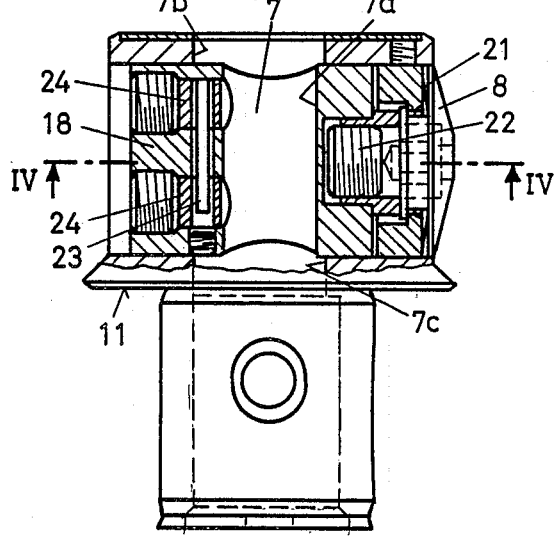

Referring now to FIGS. 2a and 2b, the boring head 4 includes a slide 18 which incorporates an otherwise known adjusting mechanism 22, comprised of an adjustment dial 8 and a spring 21 to eliminate play. Using the adjusting mechanism 22, the slide 18 (and the holding device with the cutter holder 1) can be laterally displaced within the boring head 4. After this adjustment, the slide 18 can be fixed in desired position by a clamping screw 9, through the intermediary of a parallel guide 16 (which is set without play), for the boring process. Lubricant for ease of movement of the adjusting mechanism can be introduced through a nipple 20, which also serves to prevent dirt and cutting oil from penetrating into the boring head. The leading end of the boring head 4 is protected against damage from chips by a cover plate 17 which is fastened by screws 19 and which has an opening to permit passage of the holding device. The boring head 4 also has a polished support surface 11 which is pulled against the end face 12 of the connecting portion 13 by means of a retaining screw (not shown) while the connecting shaft 10 engages a bore 14 in the connecting portion.

Referring now to FIG. 2b, the recess 7 in the boring head 4 is generally comprised of a cylindrical bore 7a provided in the slide 18, and free spaces 7b and 7c developed in the body of the boring head 4 and extending through the connecting shaft 10. In accordance with the present invention, the recess 7 is configured so that the holding device for the cutter holder 1 can be longitudinally displaced by an amount equaling at least twice the diameter of the recess 7a.

Figure 3:
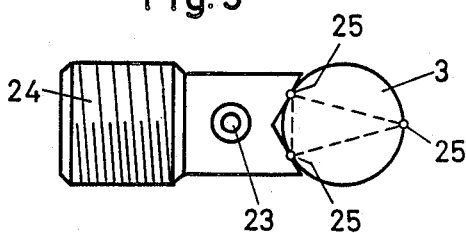
FIG. 3 is a side elevational view of the clamping mechanism for the boring attachment.
Figure 4:
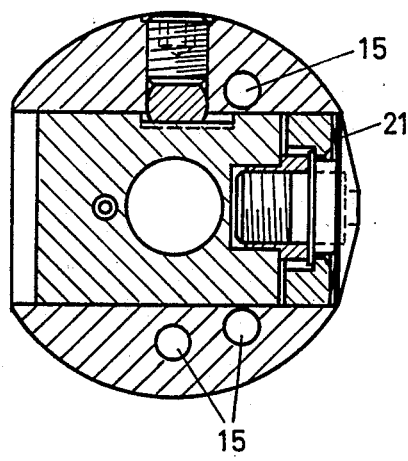
FIG. 4 is a horizontal cross-section through the boring head, taken along the line IV—IV in FIG. 2b.

As previously indicated, the slide 18 is provided with a clamping device for receiving the reducing bush 3 (which can then be clamped in its desired displaced position) which generally takes the form of a pair of two-part clamping screws 24, and a continuous mandrel 23 which serves to prevent the front parts of the clamping screws from rotating. Further in accordance with the present invention, and as is best shown in FIG. 3, the front face of each clamping screw is V-shaped to abut against the reducing bush 3 along two spaced, generally longitudinally extending support edges 25. A third support edge 25 is developed by contact between the reducing bush 3 and the slide 18. Highly stable fastening of the reducing bush 3 is thus simply achieved as a result of this "three-point support".

Figure 5:
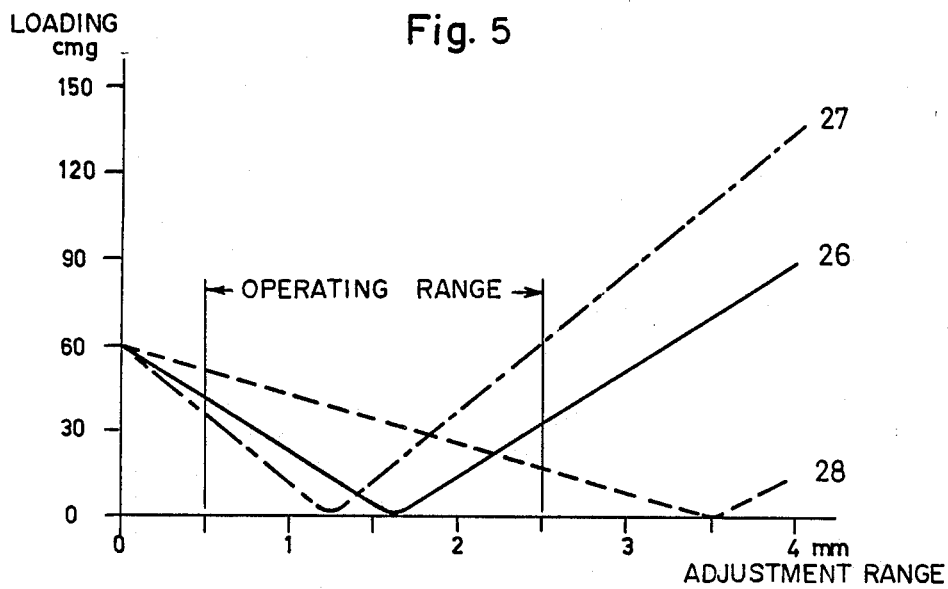
FIG. 5 shows loading curves for three boring attachments having cutter holders of different weights.

Further in accordance with the present invention, the boring head is balanced by providing bores 15 in its body such that loading (torques resulting from fulcrum imbalances) is essentially completely eliminated when the holding device is located in a transversely displaced position which is generally within a defined "operating range" for the boring head 4. For example, if the holding device is placed at a distance of about 1.6 mm from the center of the operative range of the device, there is practically no loading as evidenced by the curve 26 which is shown in solid line in the graph of FIG. 5 (which shows loading on the ordinate). The curve 26 is obtained for a holding device (with cutter holder and cutting edge) having a weight of 150 g. Since the length of the holding device is adjustable, the same curve 26 is obtained for all boring depths.

If it becomes necessary to use a longer holder with a heavier weight of 300 g, for greater boring depths, the curve 27 is obtained. A shorter holding device with a lighter weight of 50 g results in the curve 28. Since the loading curve is known and has a favorable shape in the principal (operating) range of application for the boring attachment of the present invention, it is sufficient to permanently balance the boring head 4 (e.g., by means of the bores 15).

Further in accordance with the present invention, and referring again to FIG. 2a, the distance B from the leading surface of the boring head to the support surface 11 (i.e., the overall height), which is important for stability, is smaller than the diameter A of the boring head. This reduction in the height B, and the longitudinal adjustability of the cutter holder 1, jointly contribute to optimal stability of the boring attachment under different working conditions.

Figure 6:
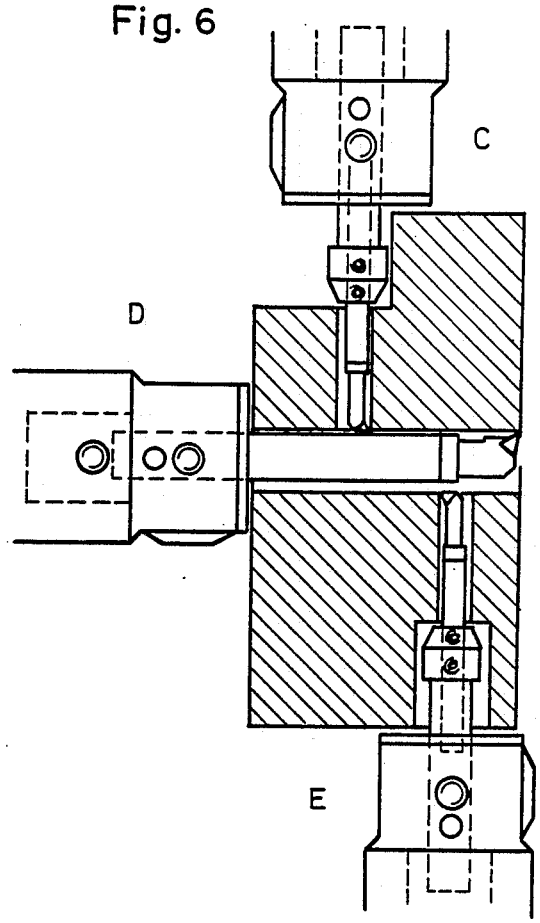
FIG. 6 is a schematic representation of an illustrative application showing cutter holders with different holding devices, which are optimally adjusted to the given working conditions.

Resulting from these factors, FIG. 6 schematically shows how the distances between the support surfaces 11 and the cutting edges (reversible carbide tips) are optimally short in each of the boring attachments C, D and E. Insofar as possible, the shafts are supported by reducing bushes 3 in the boring attachments C and E. In the boring attachment D, the holding device simply consists of a cylindrical shaft, although as previously described, this shaft will have approximately the same weight as the holding devices of the boring attachments C and E. Consequently, each of the boring attachments shown in FIG. 6 will exhibit approximately the same loading curve.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. In a boring attachment with an adjustable boring width, comprising a working head having a support surface abutting against a connecting portion and a connecting shaft axially receivable within said connecting portion, and including a transversely displaceable slide for receiving a cutter holding means and including a recess having a diameter sufficient for receiving the cutter holding means, the improvement wherein:

the recess for receiving the cutter holding means extends fully through the transversely displaceable slide so that the cutter holding means is longitudinally displaceable within the recess by an amount equaling at least twice the diameter of the recess;

the boring head is balanced such that loading is substantially eliminated when the cutter holding means is in a transversely displaced position which is within a prescribed operating range for the boring head;

the boring head has a diameter, and an overall height which is approximately equal to or less than the diameter of the boring head; and the boring head is balanced by one or more bores formed therein.

2. The boring attachment of claim 1 wherein the cutter holding means is received by a reducing bush which is telescopically adjustable in length within the recess.

3. The boring attachment of claim 1 wherein the slide and the body of the boring head are continuously hollow in an axial direction.

4. The boring attachment of claim 3 wherein the hollow body of the boring head has a diameter which is larger than the diameter of the recess of the slide so that said cutter holding means is radially displaceable therein.

5. The boring attachment of claim 1 wherein the device for clamping the cutter holding means includes two clamping screws having V-shaped faces which abut against the cutter holding means along two axial lines spaced from one another.

6. The boring attachment of claim 1 wherein said cutter holding means is comprised of a cutter holder and a reducing bush for receiving the cutter holder therein.

7. The boring attachment of claim 1 wherein the height of said boring head equals the distance from a surface of the boring head for receiving the cutter holding means to the support surface of the working head.

* * * * *